July 16, 1963
L. R. MURPHY
3,097,713
TRANSPORTABLE SCALE WITH EXTENSIBLE DECK
Filed Dec. 7, 1961
5 Sheets-Sheet 1
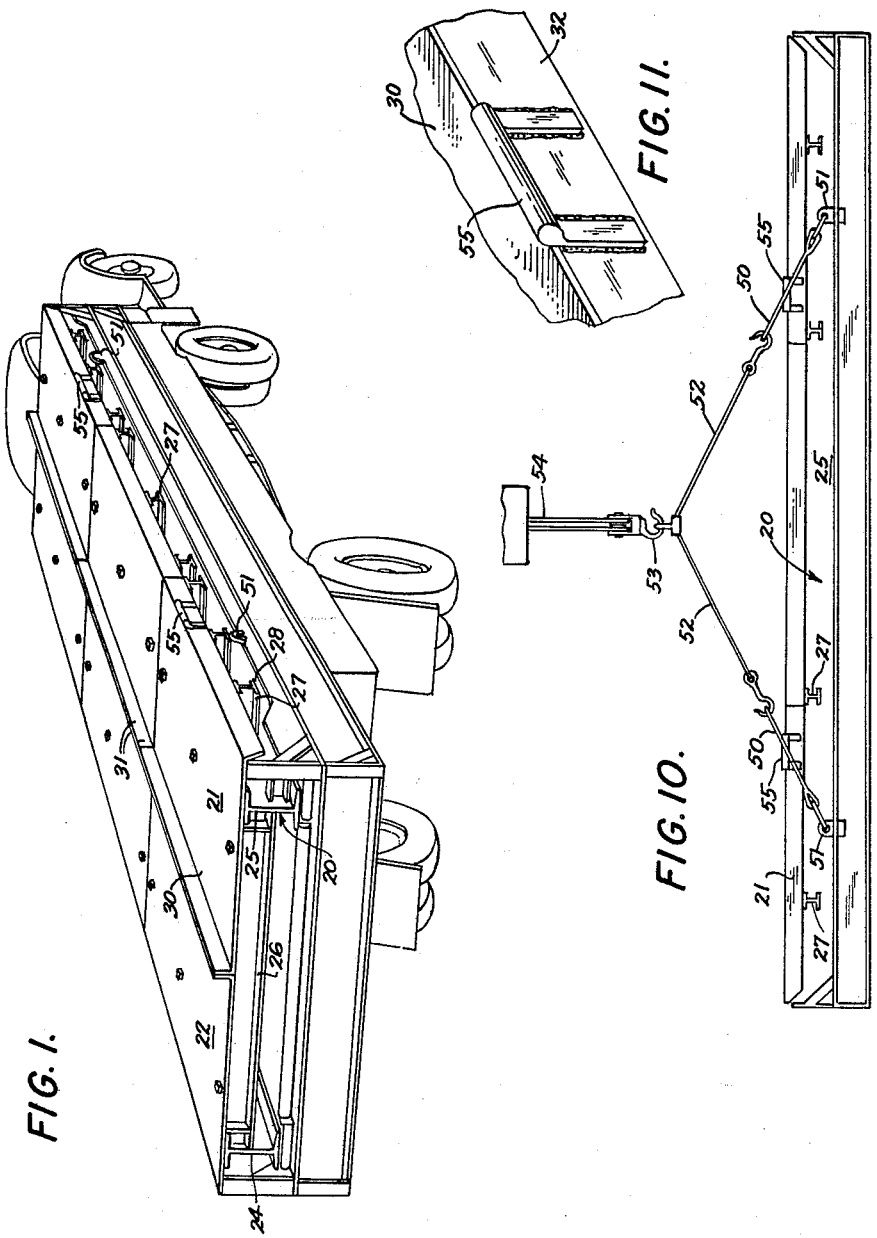
INVENTOR.
LESLIE R. MURPHY
BY
ATTORNEY

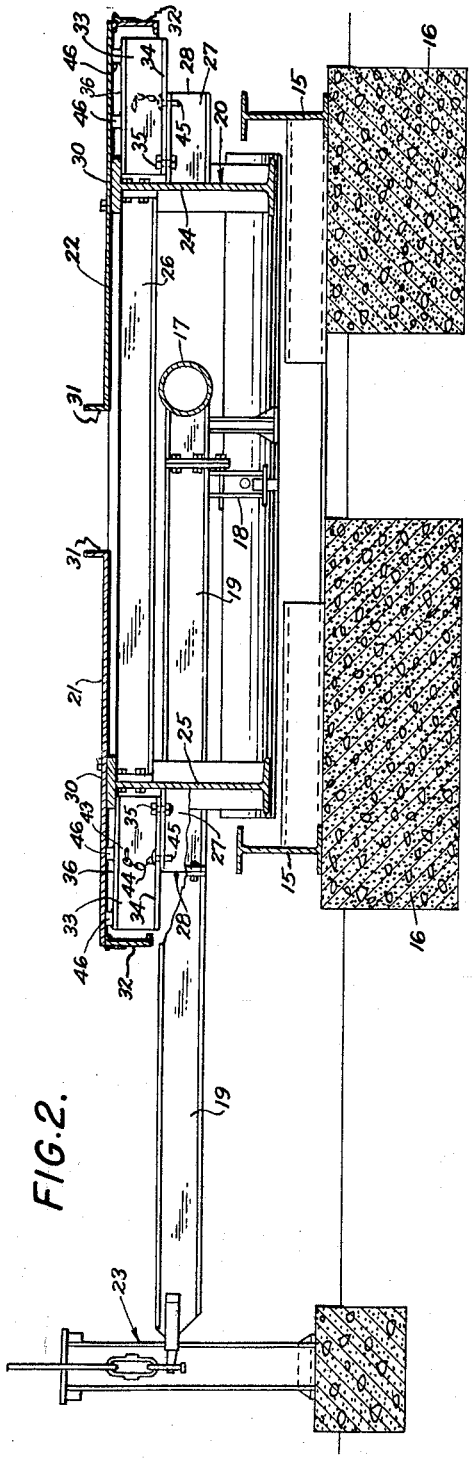

July 16, 1963  L. R. MURPHY  3,097,713
TRANSPORTABLE SCALE WITH EXTENSIBLE DECK
Filed Dec. 7, 1961  5 Sheets-Sheet 3

INVENTOR.
LESLIE R. MURPHY
BY
ATTORNEY

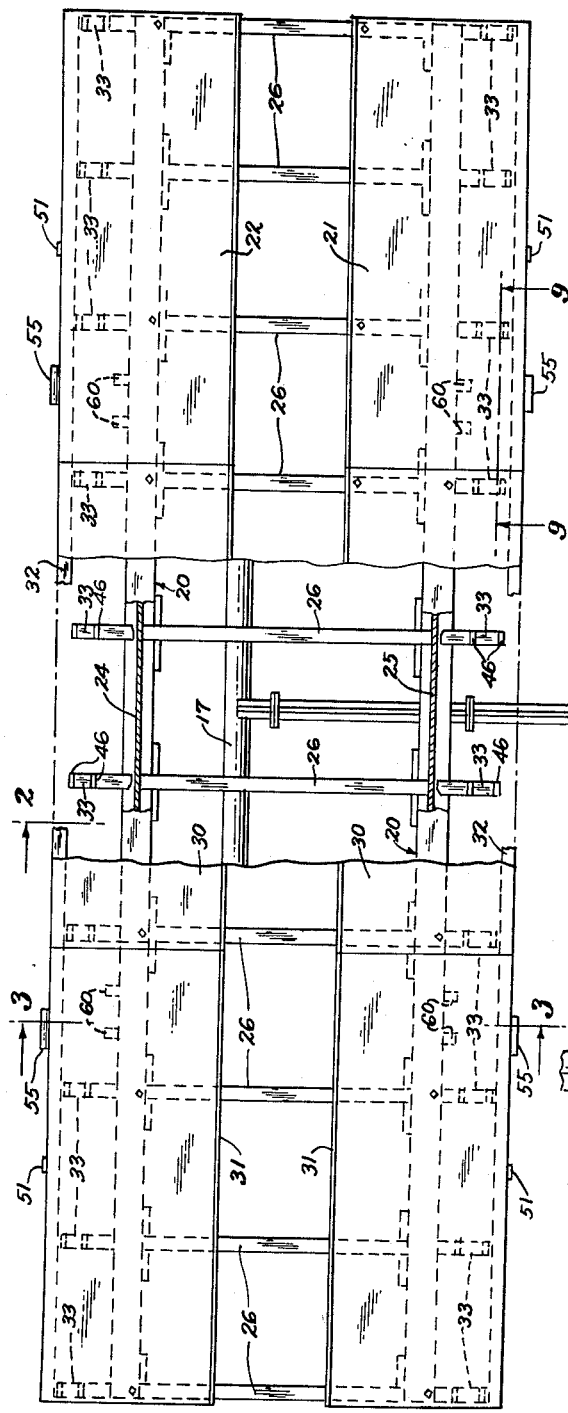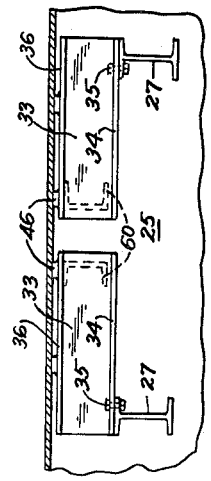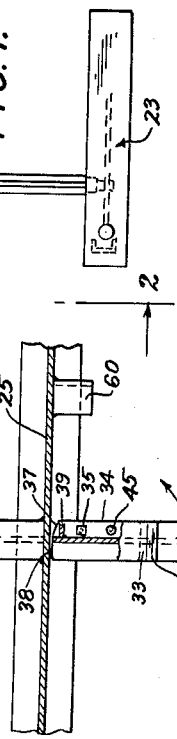

INVENTOR.
LESLIE R. MURPHY
BY
*A. Duncan Oliver*
ATTORNEY.

United States Patent Office 3,097,713
Patented July 16, 1963

3,097,713
TRANSPORTABLE SCALE WITH EXTENSIBLE DECK
Leslie R. Murphy, Sacramento, Calif., assignor to L. R. Murphy Scale Company, Sacramento, Calif., a corporation of California
Filed Dec. 7, 1961, Ser. No. 157,723
5 Claims. (Cl. 177—126)

This invention relates to improvements in transportable scales for weighing motor trucks, off-the-highway vehicles, and the like, particularly those scales having steel runways, steel plate decks, or timber decks. This application is a continuation-in-part of application Serial No. 75,225, filed December 12, 1960, now abandoned.

Heavy-duty transportable scales are difficult to provide. If a scale is wide enough so that a wide truck, barely within the highway width-limit, can be driven on the scale and weighed, then that scale is obviously wider than the limit. At present, the legal highway width is eight feet, and it is fairly easy to get a permit to move a load no more than ten feet wide. However, it is difficult to get permission to move loads wider than ten feet. Consequently, many trucks are used that are ten feet wide and that have to be weighed when loaded. Moreover, in order to weigh off-the-highway equipment (such as many earth movers and much road-building equipment) a scale with a deck thirteen or even fourteen feet wide is required. In order to get such scales to their destination or to move them from place to place, it is most inconvenient to have the scale width during transportation exceed ten feet, and in most cases scales as wide as thirteen feet would be out of the question because of the difficulty in transporting them.

Similar relationships apply to the different specific load widths that are permissible in various states. When scales are transported on rail cars and the like, there is also a standard width that must be maintained. Similar factors have to be considered even when the scales are transported off the highways, for even then they are used for weighing large off-the-highway vehicles as well as the oversize trucks which themselves are used to transport the scales. Also, clearances must be watched. In each case it is desirable to have some way to extend the width of the scale when it is used for weighing and to reduce its width when the scale is to be transported.

The present invention provides an interesting and novel solution to this problem, comprising a scale whose width can be extended at the weighing station and can be narrowed for transport.

A problem which had to be solved for successful operation of such a scale is how to support the overhang of the scale platform or deck beyond the main weighbridge girders. The rigid frame comprising the weighbridge, and made up of the main girders and the cross members, cannot be the full maximum width, nor can the weighbridge itself be extensible, because if it were, it would not have the required rigidity and strength and would not properly transmit the load to the scale lever system. The present invention provides a deck or runway that comprises two separate pieces that rest on the weigh bridge and can be moved toward each other to condense the width or away from each other to extend the width of the platform. If the scale deck is extensible and overhangs the weighbridge, as is true in the present invention, the problem then arises as to how to keep the overhanging portion from bending under the tremendous weights to which it is subjected. Even though checkered steel plate is a relatively strong material, it bends readily enough under the weight of the many-ton loads that these scales are intended to weigh. Timber decks will break under these conditions. If the platform or deck were made of rigid material that could withstand these weights, the scale would no longer be transportable.

In other words, the invention provides extensible support means for a rather lightweight steel plate deck, or for a timber deck so that the deck does not bend over or break when a truck is driven onto it slightly out of line, with part of the truck overhanging the weighbridge. As has been said before, the weighbridge itself cannot be extensible along with the platform. The present invention, therefore, is directed particularly to the solution of the problem of an extensible weighing platform with adequate support for the portion that overhangs the weighbridge.

The invention solves this problem by providing a series of short outrigger brackets along the side of the weighbridge frame and by providing a series of swinging outriggers. The outriggers are secured to the outrigger brackets by a pivotal connection extending along a vertical axis and are mounted so that they can be swung out to give an effectual widening of the weighbridge frame or can be swung in so that they do not protrude beyond the outrigger brackets of the weighbridge frame. In that way the two runways making up the deck or scale platform can be pushed together until their overall width is no greater than that of the weighbridge frame when the scale is to be transported. Then they can be pulled apart and the outriggers swung out to provide a wide deck that is adequately supported where it overhangs the weighbridge frame.

It will be noted that the present invention has some important advantages over the structure shown in my earlier Patent No. 2,869,855, which could be used only for steel plate decks and could not be used for timber decks. In the first place, no extra members are welded to the lower surface of the checkered steel runways or platform members, as were done in Patent No. 2,869,855. This fact is important because the attachment of such members made manufacturing difficult and not feasible at all with timber decks; even with steel decks critical dimensioning was required in order to space the members properly. In the second place, with the present invention it is not necessary to load to the runways for transport with their outer edges raised, as they had to be loaded in the previous patent, nor is it necessary to support them by a series of brackets along the side. It now becomes possible to have the runway platforms lie flat on top of the weighbridge during transportation, so that they are much easier to move and so that they are much better supported during transportation. In the third place, it now becomes possible for a couple of men with a minimum of equipment to set up the scale, whereas before it was a much more elaborate operation. Finally, it becomes possible to build the scale less expensively, more easily, and more quickly, and to get a better product that operates more easily and with less extra equipment required.

Another problem which this invention solves is the prevention of damage to the steel plate decks or to timber decks at the time when the scale is being lifted by derricks onto or from a truck. However, this problem will be more easily understood after the structure has been partly described; so it is presently deferred. Its importance should not be overlooked, though.

Other objects and advantages of the invention will appear from the following description of a preferred embodiment thereof.

In the drawings:
FIG. 1 is a view in perspective of a transportable scale embodying the principles of the present invention mounted upon a large transport truck, with a steel-plate scale platform shown in its narrow-width or transporting position.
FIG. 2 is a view in elevation and in vertical cross section of the scale of FIG. 1 mounted on the ground and prepared for weighing, taken along the line 2—2 in FIG. 7. The steel platform members or runways are shown in their extended position overhanging the weighbridge and supported by outriggers that have been swung to their extended position.

FIG. 3 is a view in section of a portion of the scale of FIG. 2 taken along the line 3—3 of FIG. 7, showing the position occupied by the steel platforms and the outrigger brackets when the scale platforms are moved to their inner or transporting position.

FIG. 4 is a view similar to FIG. 3 showing a modified form of steel plate runway structure. Solid lines show the platform and outriggers in their transporting position and broken lines show them in their weighing position.

FIG. 7 is a top plan view of the scale with some portions broken away in order to show some of the lever system and frame members therebeneath.

FIG. 8 is a fragmentary top plan view, with some parts broken away and shown in section, of a portion of the scale of FIG. 7 with the platform removed and the outrigger swung to its outer position.

FIG. 9 is a fragmentary view in side elevation and in section of a portion of the scale of FIG. 7, taken generally along the line 9—9 but with the outriggers folded in.

FIG. 10 is a view in side elevation of the scale of FIG. 1 showing the cable attachments used when lifting the scale onto the truck.

FIG. 11 is a fragmentary view in perspective of a protecting device in the side of the scale platform used to prevent chafing of the cable.

Figure 5:
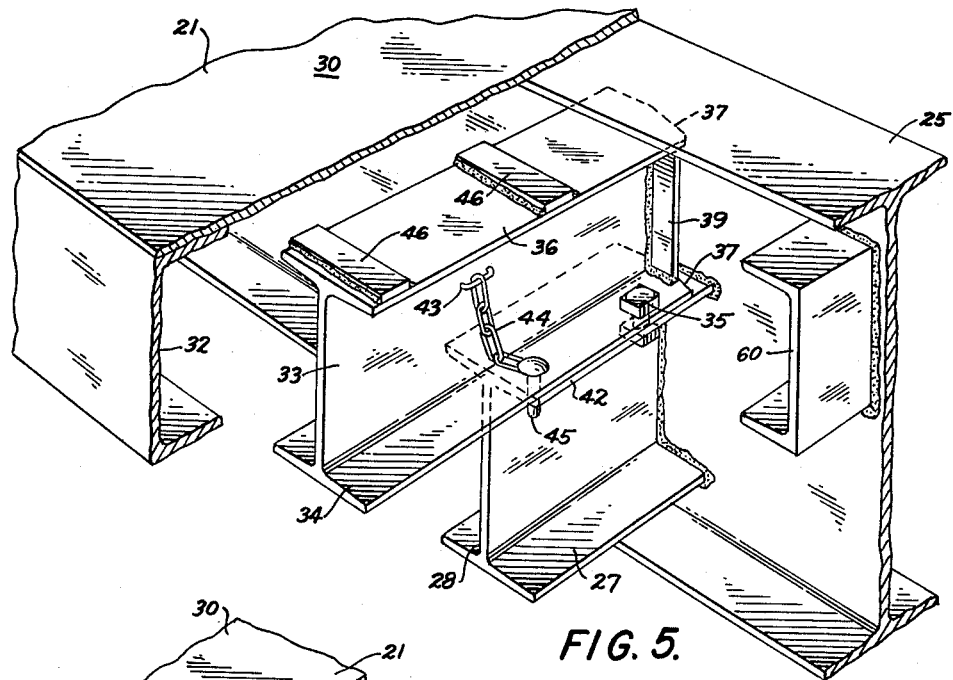
FIG. 5 is an enlarged fragmentary view in perspective of a portion of the scale showing one of the outriggers swung to its outer position for supporting the scale platform in its extended position.

Although it is transportable, as shown in FIG. 1, the scale of this invention is designed for heavy duty weighing and when set up as shown in FIG. 2, its base 15 is preferably supported on a suitable footing 16. By a suitable suspension system of the type well known in the art and only rudimentarily indicated in the drawings (it includes levers 17, 18 and 19) the base 15 supports a weighbridge 20 on which rest a pair of steel runways or platform members 21 and 22. The purpose of the deck or platform members 21 and 22 is to provide a surface on which the trucks can be driven when they are to be weighed and to transmit the load evenly to the weighbridge 20. The weighbridge 20, in turn, when depressed by the load, transmits the force through the levers 17, 18 and 19 so as to actuate a suitable lever indicating device 23 shown at the left of FIG. 2 and at the bottom of FIG. 7. There, weighbeams dial units or other indicating devices may be supplied.

This invention is concerned chiefly with the connection and cooperation between the weighbridge 20 and the platform members 21 and 22. As shown in the drawings, the weighbridge 20 preferably incorporates two very strong, heavy I-beams 24 and 25 disposed longitudinally of the scale and parallel to each other and connected together at various points by suitable laterally extending structural members 26. To the outer side of the I-beams 24 and 25 are welded, at intervals, suitable short I-beam extension members or outrigger brackets 27. The distance between the outer end 28 of the outrigger brackets 27 on one side to that on the other side corresponds approximately to the legal width of the road or to some greater width that is about the maximum for which permits are easily obtainable. In other words, where 8 feet is the legal width, the ends 28 of a scale designed for no-permit use lie approximately 8 feet apart and the I-beams 24 and 25 lie just slightly less than 8 feet apart. Or, for permit use, where a ten-foot load is the widest normally permitted, the ends 28 may lie ten feet apart. For convenience, the brackets 27 preferably are aligned with the cross members 26, although this is not absolutely necessary.

Each steel runway 21, 22 preferably comprises a flat deck 30 made of a long strip of checkered steel plate (which may be thin, e.g., ¼" to 5/16" thick, more or less) usually in lengths of approximately 10 or 12 feet. Preferably, it is provided along the inner edge with an upstanding stiffening flange 31 adapted to prevent the wheels of the vehicles to be weighed from driving off the runway 21, 22. However, runways 21' and 22' having no flange 31 may be used, as shown in FIG. 4, for a continuous platform, the pieces overlapping when in transport position. To the lower surface of the steel deck 30, along its outer edge, is welded a steel structural member 32 such as a channel beam.

On top of each outrigger bracket 27, which is always considerably shorter in height than the I-beams 24 and 25 and is mounted in a spaced distance down from their top surface, is pivotally mounted an outrigger 33. Each outrigger 33 preferably comprises a short I-beam with a base 34 joined by a pivot pin 35 to its outrigger bracket 27. The outrigger 33 also has a top horizontal portion 36 bearing against the flange 29 of the I-beam 25, and preferably, one side of the inner end of both the portion 36 and the base 35 is cut back along an edge or radius portion 37 to enable clearance when the outrigger 33 swings and which determines which way it will turn, the other side 38 being left square to prevent turning in the other direction. Also, the beveled edges or radii 37 may be strengthened, if desired, by welding a vertical member 39 to them, connecting them together.

Figure 6:
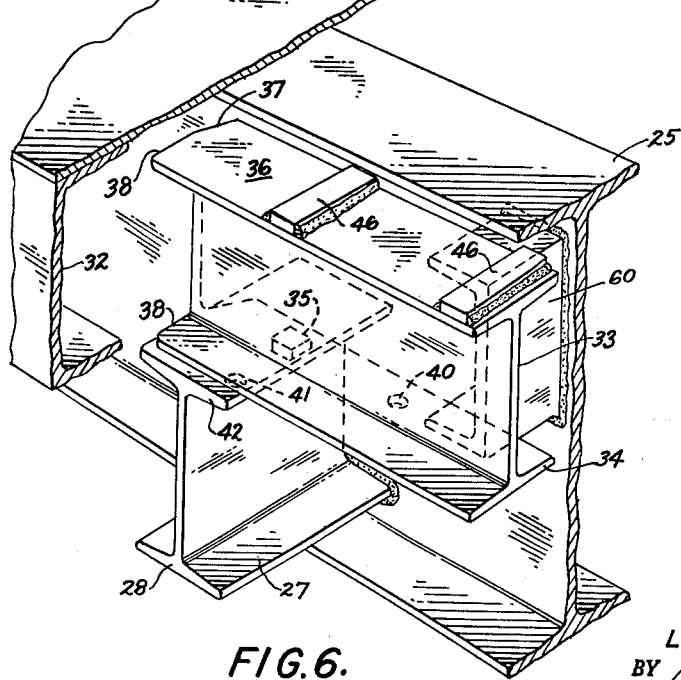
FIG. 6 is a similar view showing the same outrigger swung to its inner position for the scale platform to be supported in its transporting position.

The base 34 (see FIG. 6) also has a hole 40 spaced from pivot pin 35, and the outrigger bracket 27 has a hole 41 in its top member 42 that aligns with the hole 40 when the outrigger 33 is swung out to its extended position. The swinging outrigger 33 has a bracket 43 (see FIG. 5) to which a chain 44 is attached; at the end of the chain 44 is a suitable locking pin or rivet 45. When the outrigger 33 is swung about its pivot member 35 into its inner position, it normally rests fairly snugly against the I-beam 24 or 25, and its width is less than the length of the bracket 27. When the platforms are then pushed in, the channels 32 help to keep the outriggers 33 from swinging out accidentally. When the outrigger 33 is swung out to its outer position, it may be locked to the outrigger bracket 27 by the locking pin 45 to prevent accidental movement; in that position the outrigger 33 extends a substantial lateral distance beyond the bracket 27, this difference being approximately equal to the extension of width needed on each side of the scale.

In addition, the top plates 36 of the outriggers 33 preferably support a pair of short plates 46 whose thickness is such that their upper surfaces lie substantially level with the I-beam upper surfaces of the I-beams 24 and 25, so that the steel platforms 21, 22 are properly supported. Being spaced from the inner end 38, the plates 46 (one of which is on the outer end), do not interfere with the movement of the end 38 in under the top of the I-beam 24, 25 when the outrigger is extended.

The significance of this arrangement will now be apparent. All that need be done to extend the width of the scale is to pull out the runways 21 and 22 and then to swing the outriggers 33 out about their pivots 35, lock them in their outer positions by the pins 45, to support the runways 21, 22, and all that need be done to shorten the width of the scale platform is to fold the outriggers 33 back against the I-beams 24, 25, first releasing the locking pin 45, and then push the runways 21, 22 back towards each other. The strength provided by the supporting outrigger and the fact that the outriggers 33 rest directly on their outrigger brackets 27 when they are extended while the I-beam flange 29 at this time rests directly on the outriggers 33, are also very important features. This latter fact means that the outriggers 33 transmit their load to the brackets 27 and that they are kept from moving upwardly at their inner end, or swinging up there and swinging down at their outer end, by the engagement of the top portion 36 with the flange 29. The scale runways 21 and 22 may be bolted to the weighbridge frame in both 'their extended and their transport position. Bolting gives greater stability, and the bolts are easily removed.

Figure 12:
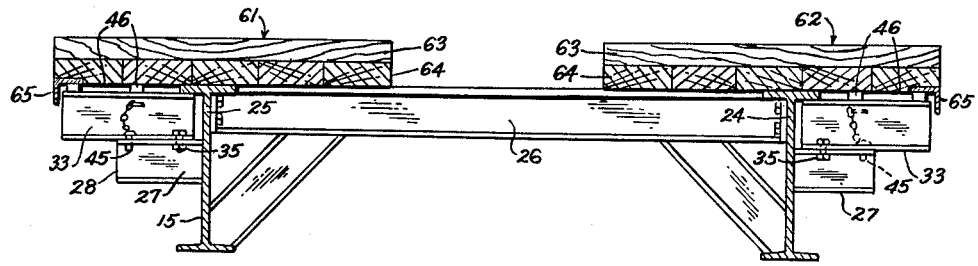
FIG. 12 is a view similar to FIG. 4 showing a scale having a wooden deck.
Figure 13:
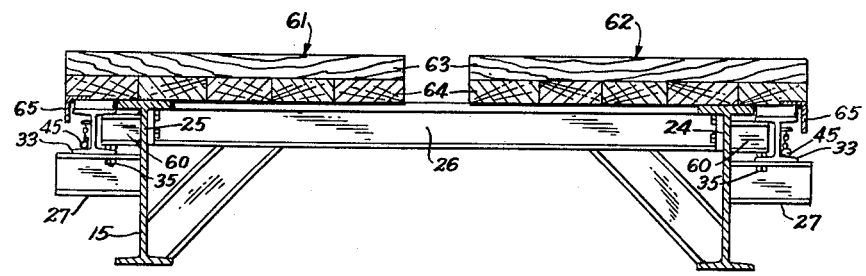
FIG. 13 is a view like FIG. 12 showing the deck and outriggers in their extended position.

FIGS. 12 and 13 show how the invention may be used with wooden decks. Here two wooden runways 61 and 62 are provided, made up of two layers 63 and 64 of wood bolted or nailed together and preferably having an angle iron 65 along the outside edges to serve the same functions as the channels 32. They may have the members 55 on them also, though they are not usually required here. As FIGS. 12 and 13 show, the weighbridge 20 remains unchanged and the outriggers 33 act as before to give the wooden runways 61 and 62 their needed support where they overhang the main girders 24 and 25.

One other structural feature deserves particular comment. When the scale is lifted by a crane, as shown in FIG. 10, four cables 50 are attached to brackets 51 on the scale base 15. To these cables 50 may be attached auxiliary cables 52, all four of which are connected to a central hook 53 which is attached by a block-and-tackle arrangement 54 to the crane (not shown). The entire weight of the scale is therefore supported through the cables 50, and they have a component of force that tends to crush the platform runways 21 and 22 in against the weighbridge 20. Even if the channels 32 are not bent, there is sufficient force to buckle the deck surface 30 and make the runways 21 and 22 unusable. There is also a problem of chafing the cables 50 on the edge of the decks 30.

This invention solves these problems by first providing a pair of cylindrical wear members 55 on each longitudinal edge of the deck 30, which give a smooth surface that prevents chafing of the cables 50 and also helps to stiffen the platform members 21 and 22. In addition, however, the scale is so arranged at this point that a pair of the outriggers 33 fold inwardly at this point against a pair of short channel members 60 that are welded to the I-beams 24, 25 and extend out perpendicularly thereto. These members 60 provide a bearing for the outriggers 33 that gives them firm support, while the outriggers 33 provide support for the channels 32, which bear against them. Thus, the force of the cables 50 is transmitted through the wear member 55 to the depending channel 32, through the channel 32 to the folded-in outrigger 33, and through the outriggers 33 to the channel support members 60 and through them to the weighbridge I-beams 24 and 25. Thus, direct support is provided to the platforms 21, 22 by the weighbridge frame, so that the force transmitted through the cables 50 will not cause collapse of the lightweight platform members 21 and 22 or of any portion thereof and will not cause buckling of the deck surface 30, as might otherwise happen.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A transportable scale comprising a base frame; a weighbridge supported on said base frame by a lever system, said weighbridge having a rigid frame, including longitudinal side members with outer flanges and with extension members projecting laterally out therefrom; outrigger members pivotally supported by said extension members and having an upper surface portion bearing against said flanges and upper surface portions substantially coplanar with the upper surface of said longitudinal side members and adapted to individually be swung out to extend the effective width of said weighbridge frame or to fold individually into a position in which they extend out no further than said extension members; a pair of platforms releasably supported on said weighbridge; and releasable means for locking each of said outrigger members to its said extension member when said outrigger members are in their extended position.

2. A transportable scale comprising a base frame having brackets for attachment thereto of cables for lifting the scale; a weighbridge supported on said base frame by a lever system, said weighbridge having a rigid frame, including longitudinal side members with top flanges and with stiffening members spaced down from said top flanges and projecting laterally out therefrom at places where said cables would pass said side frame when used for lifting said scale; outrigger members pivotally supported by said weighbridge frame and having first upper surface portions in engagement with a lower surface of said flanges and second upper surface portions substantially coplanar with the upper surface of said longitudinal side members and adapted to be swung out individually to extend the effective width of said weighbridge frame or to fold individually into a collapsed position, some of said outrigger members then engaging said stiffening members for support thereby; and a pair of platforms releasably supported on said weighbridge.

3. A transportable scale comprising a base frame; a lever system supported on said base frame; a generally rectangular weighbridge supported on said weighing levers, said weighbridge having parallel longitudinal I-beams of heavy structural steel with top and bottom flanges and lateral extension members spaced down from said top flanges and extending outwardly from a lower part of said I-beams, and also having short channel members located in pairs at each of two positions and extending out transversely from an upper portion of said I-beams at a spaced distance from said extension members; a pair of platforms supported by said weighbridge, and having depending edge members overhanging said I-beam; a plurality of outriggers pivotally supported on the upper surface of said lateral extension members, for swinging movement against and away from said I-beam, the width of said outriggers being less than the length of said extension members, while their length is substantially greater so that said outriggers normally extend out beyond said lateral members and affording support for said platforms all the way to their edge channel members, and the height of said outriggers being such that they rest on said lateral extension members and also bear against said top flanges when extended, two of said outrigger members being foldable against each pair of said projecting channels; locking means for locking each said outrigger to its said lateral extension member in its outer position; and brackets on said base frame for supporting lifting cables, so that two cables can be secured on each side of the said scale and held at a central point when lifting the scale, said cables having wear surfaces lying directly over said channel-member-supported outriggers when they are folded to their inner positions against said channel members so that support is provided therefor.

4. A transportable scale comprising a base frame; a lever system supported on said base frame; a generally rectangular weighbridge supported on said weighing levers, said weighbridge having parallel longitudinal I-beams of heavy structural steel with top and bottom flanges, lateral extension members extending outwardly from a lower part thereof spaced down from said top flanges and also having short channel members located in pairs at each of two positions and extending out transversely from an upper portion of said I-beams at a spaced distance from said extension members; a pair of steel plate platforms supported by said weighbridge, and having edge channel members overhanging said I-beam; a plurality of outriggers pivotally supported on the upper surface of said lateral extension members, for swinging movement against and away from said I-beam, the width of said outriggers being less than the length of said extension members, while their length is substantially greater so that said outriggers normally extend out beyond said lateral members and affording support for said platforms all the way to their edge channel members, and having upper surface portions bearing against the top flanges of said I-beam, two of said outrigger members being foldable against each pair of said projecting channels; locking means for locking each said outrigger to its said lateral extension members in its outer position; wear members on the portions of the edges of said platforms in line with said projecting channels and brackets on said base frame for supporting lifting cables, so that two cables can be secured on each side of said scale and held at a central point when lifting the scale, said cables having wear surfaces lying directly over said channel-member-supported outriggers when they are folded to their inner positions against said channel members so that support is provided therefor, said wear members protecting platforms from said cable and stiffening said platforms.

5. A transportable scale comprising a base frame; a lever system supported on said base frame; a weighbridge supported on said weighing levers, said weighbridge being generally rectangular and having parallel longitudinal I-beams of heavy structural steel connected by cross members and having top flanges and lateral extension members in alignment with said cross members extending outwardly from a lower part of the outside surfaces of said I-beams, spaced below said top flanges, said weighbridge also having short channel members located in pairs at each of two positions on each I-beam and extending out transversely to said I-beam on the upper half of said I-beam a spaced distance from said extension members; a pair of platforms secured to said weighbridge and spaced apart from each other and overhanging said I-beam, having edge members depending therefrom, the total overhang being substantially the same distance as their spacing apart from each other; a plurality of outriggers pivotally supported on the upper surface of said lateral extension members and having an upper surface portion bearing against said top flange, from below, for swinging movement away from and against said I-beam, their width being shorter than the length of said extension members, and normally extending out beyond said lateral members and affording support for said platforms all the way to their edge members; locking means for locking each said outrigger to its said lateral extension member in its outer position, each said outrigger having one side of its inner edge shaped to enable convenient turning, two of said outrigger members being foldable against each pair of said projecting channels; brackets on said base frame for supporting lifting cables, so that two cables can be secured on each side of said scale and held at a central point when lifting the scale; wear surfaces on the edges of said platforms adapted to protect said platforms from said cable and to stiffen said platforms, said wear surfaces lying directly over said channel-member-supported outriggers when they are folded to their inner positions against said channel members so that support is provided therefor.

References Cited in the file of this patent
UNITED STATES PATENTS 2,869,855    Murphy _____ June 20, 1959
3,043,386    Marion et al. _____ July 10, 1962